United States Patent
Mason et al.

(10) Patent No.: US 11,010,917 B2
(45) Date of Patent: *May 18, 2021

(54) SYSTEMS AND METHODS FOR POSITION AND POSE DETERMINATION AND TRACKING

(71) Applicant: GameFace Labs Inc., San Francisco, CA (US)

(72) Inventors: Edward Mason, East Sussex (GB); Aidan Delaney, Eastbourne (GB); Brady James Riddle, Layton, UT (US)

(73) Assignee: GAMEFACE LABS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,514

(22) Filed: Sep. 6, 2019

(65) Prior Publication Data

US 2019/0392608 A1 Dec. 26, 2019

Related U.S. Application Data

(63) Continuation of application No. 16/029,414, filed on Jul. 6, 2018, now Pat. No. 10,460,469.

(Continued)

(51) Int. Cl.
*G06T 7/00* (2017.01)
*G06T 7/70* (2017.01)
(Continued)

(52) U.S. Cl.
CPC .................. *G06T 7/70* (2017.01); *G01C 3/10* (2013.01); *G01C 21/12* (2013.01); *G01C 21/20* (2013.01);
(Continued)

(58) Field of Classification Search
None
See application file for complete search history.

(56) References Cited

U.S. PATENT DOCUMENTS 5,059,781 A 10/1991 Langdon
9,901,816 B2 * 2/2018 Lee ........................ A63F 13/214
(Continued)

OTHER PUBLICATIONS

Extended European Search Report for EP Application 18828929.2 dated Mar. 15, 2021.

*Primary Examiner* — Martin Mushambo
(74) *Attorney, Agent, or Firm* — Bryan Cave Leighton Paisner LLP

(57) ABSTRACT

Systems and methods are disclosed for determining position and pose of as well as tracking an object in a physical environment based on the emission and sensing of light signals. The derived position, pose and tracking information may be used in a VR/AR environment. The disclosed systems and methods allow for the improved tracking of both active and passive devices. In addition, the disclosed systems and methods enable an arbitrary number of light sensors to be disposed on an object, thereby increasing accuracy and mitigating the effects of occlusion of certain light sensors. Position and pose estimates may be refined and tracked using a filter lattice responsive to changes in observed system states and/or settings. Further, data received from an inertial measurement unit may be used to increase tracking accuracy as well as position and pose determination itself.

22 Claims, 12 Drawing Sheets

Related U.S. Application Data

(60) Provisional application No. 62/530,058, filed on Jul. 7, 2017.

(51) Int. Cl.

| | | |
|---|---|---|
| *G06T 19/00* | (2011.01) | |
| *G01S 17/46* | (2006.01) | |
| *G01C 3/10* | (2006.01) | |
| *G01S 1/70* | (2006.01) | |
| *G01C 21/12* | (2006.01) | |
| *G01C 21/20* | (2006.01) | |
| *G01S 5/16* | (2006.01) | |

(52) U.S. Cl.
CPC ................. *G01S 1/70* (2013.01); *G01S 5/16* (2013.01); *G01S 17/46* (2013.01); *G06T 19/006* (2013.01); *G06T 2207/10052* (2013.01); *G06T 2207/30244* (2013.01)

(56) References Cited

U.S. PATENT DOCUMENTS

| | | | |
|---|---|---|---|
| 9,911,232 B2* | 3/2018 | Shapira | G06F 3/012 |
| 9,916,496 B2* | 3/2018 | Vandonkelaar | A63F 13/352 |
| 10,071,306 B2* | 9/2018 | Vandonkelaar | A63F 13/33 |
| 2016/0054837 A1* | 2/2016 | Stafford | G02B 27/017 |
| | | | 463/33 |
| 2016/0252753 A1* | 9/2016 | Deng | G03F 9/7088 |
| | | | 29/281.5 |

* cited by examiner

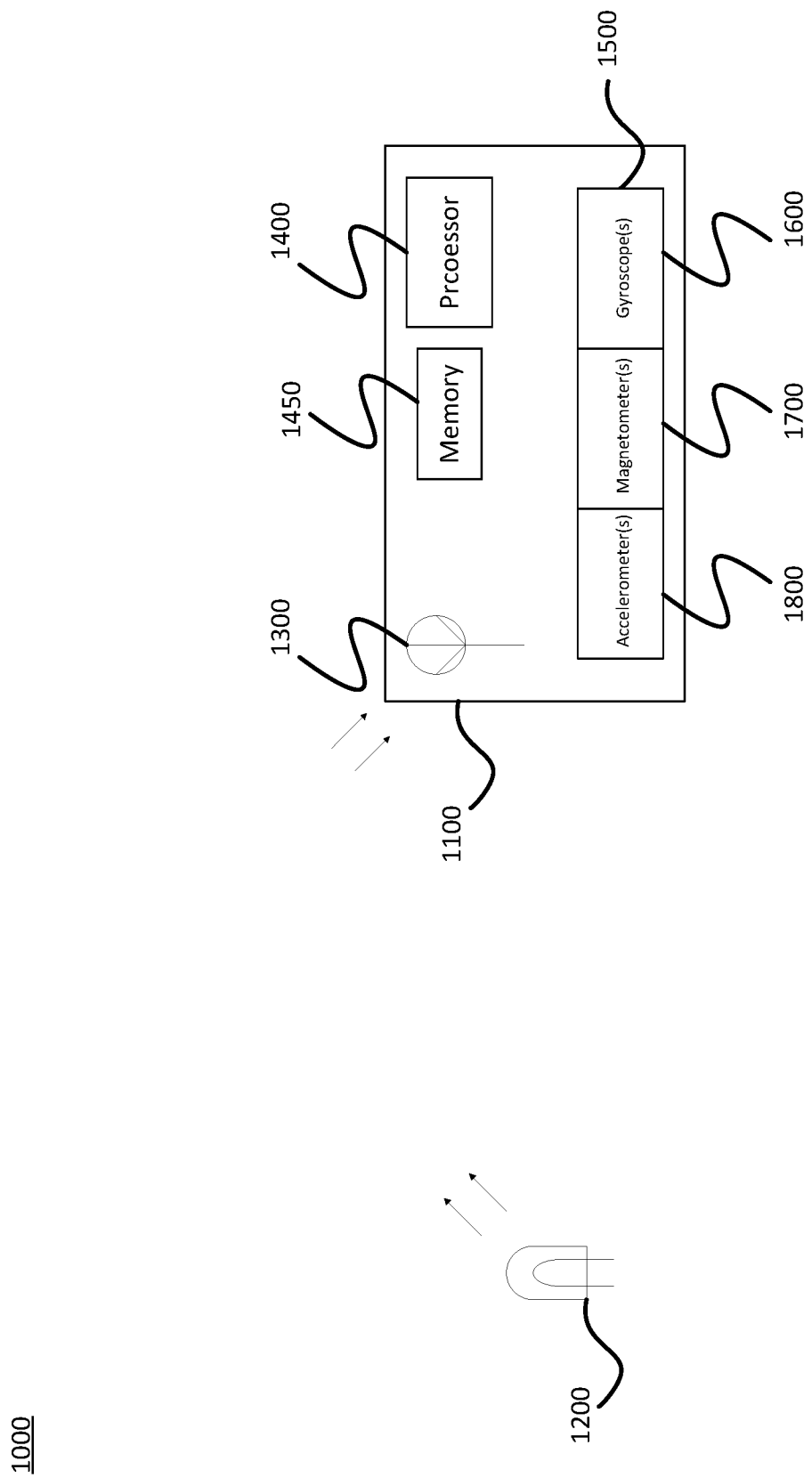

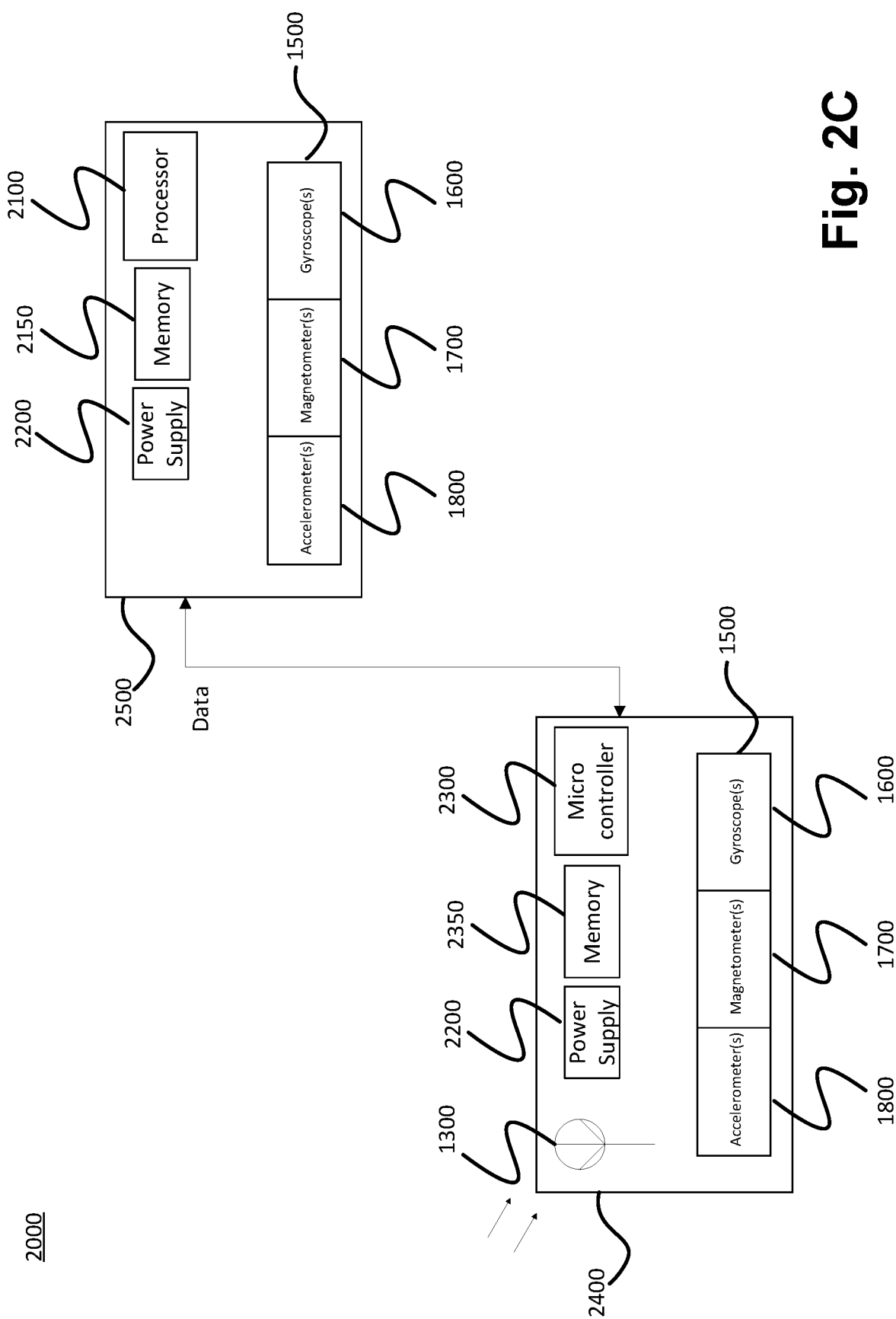

SYSTEMS AND METHODS FOR POSITION AND POSE DETERMINATION AND TRACKING

CROSS-REFERENCE TO RELATED APPLICATIONS

This application is a continuation of U.S. patent application Ser. No. 16/029,414 filed Jul. 6, 2018, published as U.S. Patent Application Publication 2019/0012801, and now U.S. Pat. No. 10,460,469, which claims the benefit of U.S. Provisional Patent Application No. 62/530,058 filed on Jul. 7, 2017. The contents of all of the above identified applications, patents, and patent publications are hereby incorporated by reference herein in their entireties.

FIELD OF THE INVENTION

The present invention relates to the field of determining the position of and tracking objects using transmitted light. Specifically, the invention relates to position and pose determination and the tracking of objects, such as headsets and controllers for use in an environment (e.g., Virtual Reality (VR) and/or Augmented Reality (AR)) using the capture and/or derivation of light timing data.

BACKGROUND

Current solutions for position and pose determination and tracking of objects suffer from several deficiencies. For example, devices intended for a mobile environment are confined to 3 Degree-of-Freedom (3 DoF) tracking solutions. In other words, these systems are only able to track a user's motion through three axes of movement: yaw (normal axis), pitch (lateral axis) and roll (longitudinal axis) about a fixed position (i.e., there is no translation). Because these systems lack the 6 Degree-of-Freedom (6 DoF) present in the physical world, developers using these systems are restricted in the level of immersion they can provide within their applications. In addition, these current solutions are only able to provide limited precision, which may be acceptable for gaming, but is inadequate for certain simulations (e.g., surgical simulation), education, and other use cases where true immersion is required.

On the other hand, current 6 DoF positional tracking technology generally requires a powerful computer to derive and calculate the relative position of a user whilst inside a VR or AR environment. For example, this technology may consist of an external infrared lamp, which may be referred to as a "Base Station" or "Beacon." These Base Stations broadcast horizontal and vertical sweeps of infrared (IR) light into a physical space at about 60 times a second. The IR light sweeps are received by IR sensors (e.g., diodes) integrated into objects within the physical space. The IR diodes will interact with the IR sweeps and interpret them as timing data. The timing data from all of the IR diodes is transmitted via a tethered or wireless connection to an x86 (or similarly powerful) machine. The x86 machine then calculates all the time differences between all the individual IR diodes (e.g., on the user's headset and input controllers) and can then calculate a sub-millimeter XYZ position for the user, 60 times a second. Thus, 6 DoF tracking has been restricted to high-powered and relatively non-mobile (tethered) solutions, such as x86-based architectures.

SUMMARY OF THE INVENTION

Accordingly, there is a need to provide an integrated mobile solution for determining position and pose as well as for tracking objects in a physical environment for use in VR/AR technology that will enable developers of mobile VR applications to increase user immersion. Moreover, this integrated mobile solution should provide 6 DoF capabilities as well as sub-millimeter precision without the need to tether to or employ an architecture such as the x86.

In addition, there is a need to provide robust position sensing/tracking in order to enhance the user experience in the AR/VR environment. For example, there is a need to reduce the effect of judder in the mapping to the AR/VR environment, which is caused by measurement noise in the position estimation within the physical environment. At the same time, there is a need for high-responsiveness, such that the AR/VR environment is able to respond to the sudden motion of tracked objects.

Systems and methods for determining the position and pose of an object are provided. In certain embodiments, the object comprises at least four light sensors. The systems and methods derive angular position relative to an emitter for at least one of the four light sensors based on light received from the emitter at the least one light sensor, the angular position including azimuth, and elevation. The systems and methods also determine a number (N) of light sensors that are used to solve a system of equations using the derived angular position, the system of equations comprising at least (N) simultaneous equations, the solution of which provides estimates of the ranges of the (N) light sensors, the number (N) of light sensors being at least three. The systems and methods further determine which of the at least four light sensors are used to solve the system of equations and using the system of equations, solve for a range of each of the (N) light sensors. The systems and methods also use a rigid body transform and at least one of the solved for ranges or the derived angular position to determine a rigid-body position for any of the four or more light sensors that were not used to solve the system of equations.

In certain embodiments, the at least (N) simultaneous equations is equal to (N). In certain embodiments, in order to determine the number (N) of light sensors that are used to solve a system of equations, the systems and methods further observe a system state; determine how many of the at least four light sensors received light exceeding a threshold; or determine how many sensors are needed to cover a minimum area or volume on the object. In certain embodiments, the system states comprise at least one of: battery power, battery usage rate, CPU loading, I/O loading, temperature, and frame rate. In certain embodiments, in order to determine which of the at least four lights sensors are used to solve the system of equations, the systems and methods further determine a maximum area or volume covered on the object by the (N) sensors; determine a time difference between when at least two of the at least four light sensors received light; determine which of the at least four lights sensors received the most light; select from a group of previously used sensors; or use a state in a virtual reality/augmented reality environment.

In certain embodiments, the system and methods further observe a system state; select a filter from an ordered filter lattice based on the observed system state; and update the selected filter with the solved-for range, derived angular position, or determined rigid-body position of one of the four or more light sensors. In certain embodiments, the system and methods further receive inertial measurement unit data, and using a predetermined threshold, determine if the received inertial measurement unit data represents a motion event; and in response to determining that the received inertial measurement unit data represents a motion event, forward time project the output of the selected filter using the received inertial measurement unit data; and use the forward time projected output as an initial solution to the system of at least (N) simultaneous equations.

In certain embodiments, in order to derive angular position, the system and methods further detect the start of a sync flash emitted by the emitter when a certain number of the at least four light sensors receive light within a given period of time; and receive timing data associated with one or more of the at least four light sensors that detect light during a sweep following the detected sync flash. In certain embodiments, in order to derive angular position, the system and methods further determine an offset between the frequency of light received at the at least one of the four light sensors and a base frequency of light emitted by the emitter.

In certain embodiments, the object comprises a power source and a microcontroller coupled to the four or more light sensors, where the microcontroller is configured to: transmit data associated with the least one of the four light sensors that received light to the processor; and wherein the processor is located on a second device distinct from the object that is also wired or wirelessly coupled to the microcontroller. In certain embodiments, the object comprises a microcontroller coupled to the four or more light sensors, where the microcontroller is configured to: transmit data associated with the least one of the four light sensors that received light to the processor; and wherein the processor is located on a second device distinct from the object that is coupled to the object via a cable that supplies power to the four or more light sensors and/or the microcontroller.

BRIEF DESCRIPTION OF THE DRAWINGS

To facilitate further description of the embodiments, the following drawings are provided, in which like references are intended to refer to like or corresponding parts, and in which:

FIG. 1 is a block diagram illustrating a system in accordance with certain embodiments;

FIG. 2C is a block diagram illustrating a system in accordance with certain embodiments;

DESCRIPTION OF THE INVENTION

Figure 2A:
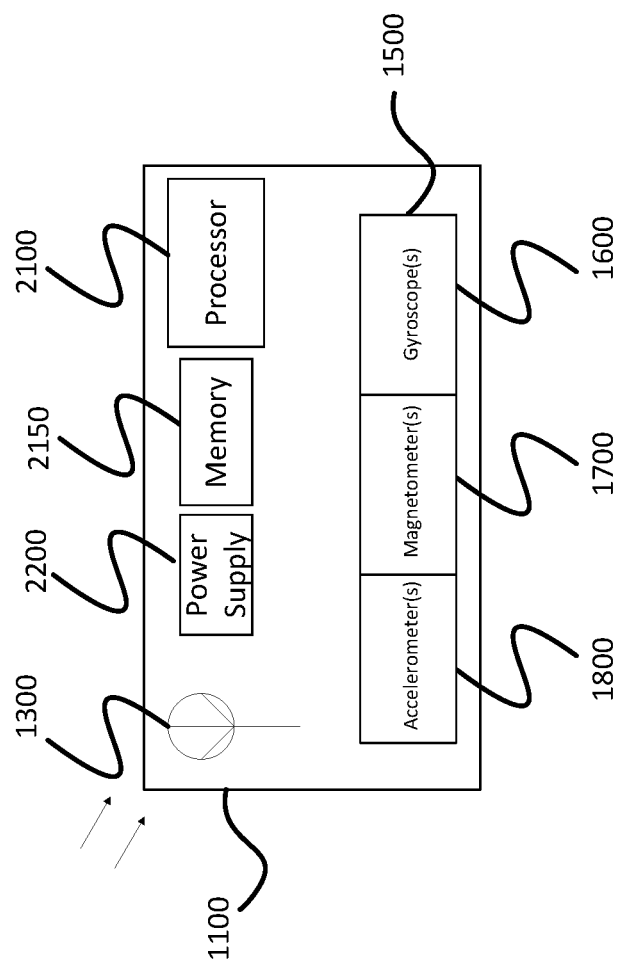
FIG. 2A is a block diagram illustrating a system in accordance with certain embodiments.

FIG. 1 depicts an exemplary system 1000 for determining an object's (e.g., object 1100) position and pose and for tracking such objects within a physical space in accordance with certain embodiments. Such an object may be a VR/AR headset, controller, or generally any tool (such as a scalpel, paintbrush, sword), that is capable of being manipulated or positioned in a physical environment. Determination of position and pose of as well as tracking such objects has applicability in the fields of gaming, procedure simulation/emulation, as well as VR/AR generally. For example, a positioned and tracked VR headset may be used to orient the camera in a VR/AR environment, while a tracked controller may allow interaction in the VR/AR environment. Additionally, a tracked scalpel may be used in medical simulations or training, while a tracked paintbrush may be used to create digital artwork or allow the precise re-creation of a piece originally created via the tracked object.

System 1000 may include one or more light (e.g., IR) emitters (1200). These emitters may be capable of performing one or more sweeps of a physical environment. In certain embodiments, these sweeps may be orthogonal to each other (e.g., vertical, horizontal, and/or diagonal sweeps). In certain embodiments, a light emitter may also be capable of transmitting a "sync flash," which is a wide area saturation of light. A sync flash may be used to indicate external timing and/or the timing (e.g., beginning/end) of another type of operation such as a sweep (horizontal/vertical/diagonal), which emits a more narrow band of light when compared to a sync flash. As an example, a Lighthouse base station developed by Valve may be used as an IR emitter.

In certain embodiments, the system includes one or more light sensors (1300) capable of detecting light emitted from one or more light emitters. As an example, the light sensors may be a Triad Semiconductor's TS3633-CM1 Castellated Module. In certain embodiments, the light sensors are embedded within or on an object (e.g., object 1100) such as a VR-headset, controller, or tool. In certain embodiments, the positions of the light sensors are fixed relative to each other. In these embodiments, a rigid-body transform may be used to determine the positions of the light sensors in the environment when less than all light sensors receive light.

In certain embodiments, the system includes one or more processors (1400) and a memory (1450). In certain embodiments, the processor is capable of receiving data from the one or more light sensors. For example, the processor may be capable of receiving information indicating that a light sensor may have received light emitted from a light emitter. In certain embodiments, by using a hardware interrupt, the processor may detect the transition of a light sensor from a high-to-low state. As an example, the processor may be an Nvidia Tegra, Qualcomm Snapdragon, PowerVR or an Exynos ARM device. Light sensors may be wired or wirelessly connected to the one or more processors.

In certain embodiments, the system includes one or more inertial measurement units (IMUs) (1500), which may be embedded within or on an object (e.g., object 1100). An IMU may include one or more gyroscopes (1600), magnetometers (1700), and/or accelerometers (1800), which may be disposed in one or more axes. For example, a tri-axial IMU may include three sets of gyroscopes, magnetometers, and/or accelerometers disposed in three orthogonal axes. Accordingly, the one or more processors may receive readings representing yaw rate, magnetic field strength, and/or acceleration in or more axes from an IMU.

Figure 2B:
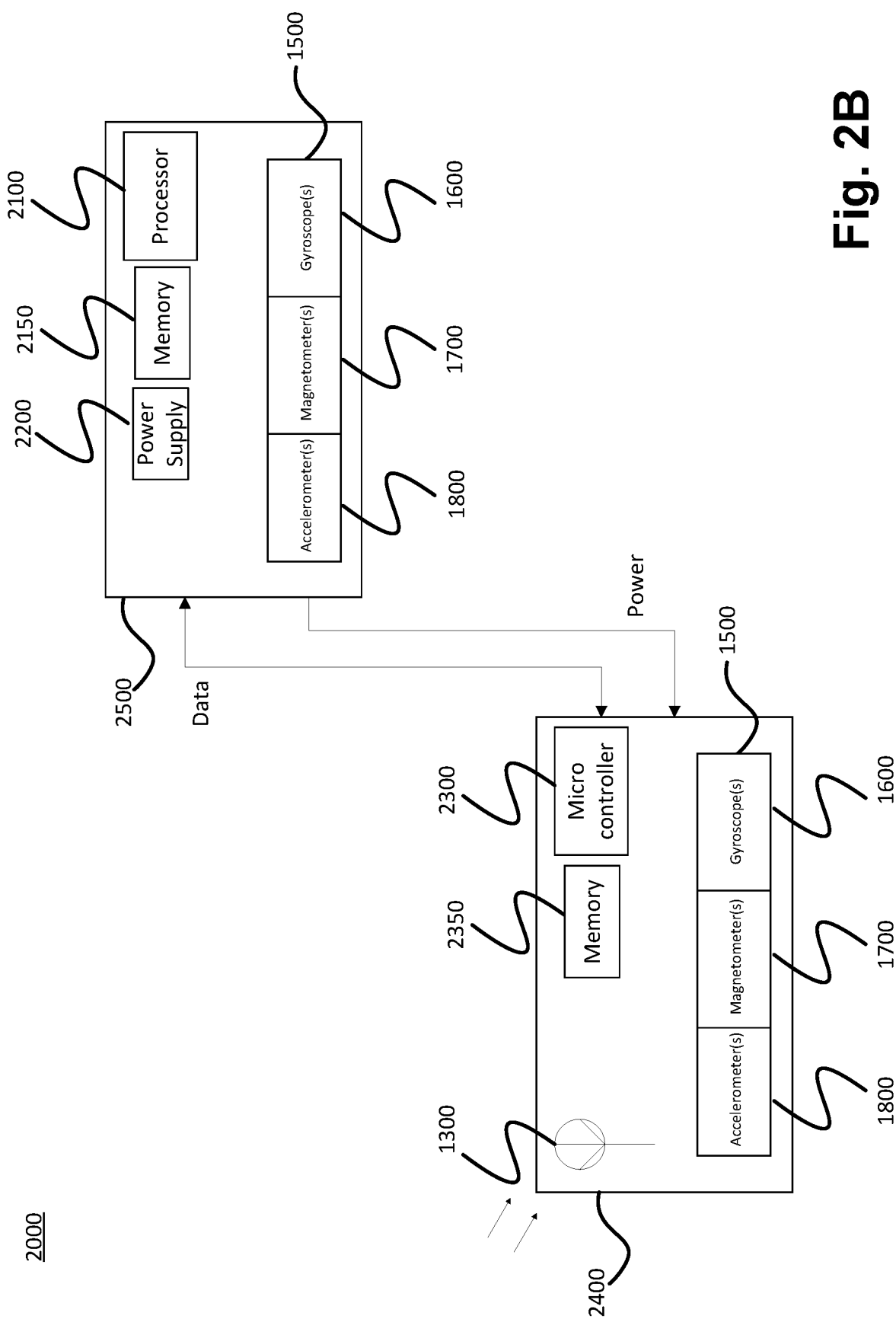
FIG. 2B is a block diagram illustrating a system in accordance with certain embodiments.

FIGS. 2A, 2B, and 2C depict various exemplary architectures of a system 2000 for determining an object's (e.g., object 1100 of FIG. 1) position and pose and for tracking such objects within a physical space in accordance with certain embodiments. These architectures may be used to determine an object's position (e.g., object 1100 of FIG. 1) using any of the methods discussed in accordance with FIGS. 4 and 7-9.

FIG. 2A depicts an embodiment of system 2000 using a single processor (2100) coupled to a memory (2150) for determining an object's position and pose and for tracking such objects within a space. System 2000 may also include a power source (2200) (e.g., a DC source such as a battery, AC source, or AC/DC converter), one or more light sensors (e.g., light sensors 1300 of FIG. 1) and an IMU (e.g., IMU 1500 of FIG. 1). For example, the system of FIG. 2A may be incorporated into a standalone VR headset.

FIG. 2B depicts an embodiment of system 2000 using multiple processors (e.g., processor (2100) coupled to a memory (2150) and/or microcontroller (2300) coupled to a memory (2350)) for determining an object's position and pose and for tracking such objects within a space. System 2000 may also include a power source (2200) (e.g., a DC source such as a battery, AC source, or AC/DC converter), one or more light sensors (e.g., light sensors 1300 of FIG. 1) and an IMU (e.g., IMU 1500 of FIG. 1). In certain embodiments, one or more processors (e.g., microcontroller 2300) may interface with light sensors to receive light sensor data. For example, microcontroller (2300) may be connected or coupled to one or more light sensors wirelessly (e.g., Wi-Fi, Zigbee, Bluetooth) or via a wired connection (e.g., USB, I$^2$C, SPI, a connector, or other cable). In turn, microcontroller (2300) may be coupled via wire (e.g., USB) or wirelessly (e.g., Wi-Fi, Zigbee, Bluetooth) to one or more secondary processors (e.g., processor 2100) for determining a position for and tracking objects using the sensor data. In certain embodiments, one processor (e.g., microcontroller 2300) and light sensors (e.g., light sensors 1300 of FIG. 1) are part of a first device (e.g., device 2400), while a second processor (e.g., processor 2100) and power source (2200) are part of a second device (e.g., device 2500). In certain embodiments, an IMU (e.g., IMU 1500 of FIG. 1) may be part of the first device and connected or coupled to microcontroller (2300) wirelessly (e.g., Wi-Fi, Zigbee, Bluetooth) or via a wired connection (e.g., USB, I$^2$C, SPI, a connector, or other cable). In certain embodiments, an IMU (e.g., IMU 1500 of FIG. 1) may be part of the second device and connected or coupled to processor (2100) wirelessly (e.g., Wi-Fi, Zigbee, Bluetooth) or via a wired connection (e.g., USB, I$^2$C, SPI, a connector, or other cable). In certain embodiments, an IMU (e.g., IMU 1500 of FIG. 1) may be part of both first and second devices. In certain embodiments, when IMUs are located on both first and second devices, the system may fuse together IMU measurement data received from both IMU sources or may select between using IMU measurement data from the first or second device based on a variety of factors. For example, IMU measurement data may be selected based on the relative accuracy of each IMU in the aggregate or of the individual components (e.g., gyroscope, magnetometer, accelerometer). In certain embodiments, IMU measurement data may be selected based on the relative power requirements of each IMU. In certain embodiments, the unselected (e.g., high power or lower accuracy) IMU is shutdown (e.g., disconnected from its power source). First and second devices may also be connected or coupled to one another wirelessly (e.g., Wi-Fi, Zigbee, Bluetooth) or via a wired connection (e.g., USB, I$^2$C, SPI, a connector, or other cable).

In certain embodiments, power is supplied to the microcontroller, light sensors and/or IMU via a wired connection (e.g., USB) from another device such as a device (2500) including processor (2100) and power source (2200). In certain embodiments, the one or more processors (e.g., microcontroller 2300) which interface with the light sensors transmit the light sensor data received from the light sensors to the one or more processors (e.g., processor 2100) for determining the position of and tracking objects using the sensor data. In certain embodiments, the one or more processors (e.g., microcontroller 2300 or processor 2100) which interface with the IMU transmits the IMU measurement data received from the IMU to one or more other processors (e.g., processor 2100 or microcontroller 2300) for determining the position of and tracking objects using the sensor data. In certain embodiments, processor 2100 for determining position of and tracking objects may be included in a smartphone or other similar device. The smartphone may then be coupled to the light sensors and microprocessor (2300) via a USB connection.

To further illustrate, certain VR and/or AR devices (e.g., headsets) may use a connection to a standalone processor platform, which may be a mobile device, such as a mobile phone, phablet or tablet. Here, the mobile device's processor (e.g., processor 2100, which may be an ARM processor) controls the user experience (e.g., provides display and calculates/tracks position of the AR/VR device). The standalone processor platform may be further integrated with one or more plates on which light sensors may be disposed. Light sensor/timing data may be transmitted to the mobile device's processor by a second processor (e.g., microcontroller 2300) which interfaces with light sensors (e.g., light sensors 1300 of FIG. 1) to receive light sensor data. Transmission of light sensor data to processor 2100 may occur over Wi-Fi, USB etc. In this case, power for the light sensors and the interfacing light sensor processor/microcontroller may be supplied by the standalone processor platform via a connection provided by the standalone processor platform (e.g., USB).

FIG. 2C depicts an embodiment of system 2000 using multiple processors (e.g., processor (2100) coupled to a memory (2150) and/or microcontroller (2300) coupled to a memory (2350)) for determining an object's position and pose and for tracking such objects within a space. System 2000 may also include a power source (2200) (e.g., a DC source such as a battery, AC source, or AC/DC converter), one or more light sensors (e.g., light sensors 1300 of FIG. 1) and an IMU (e.g., IMU 1500 of FIG. 1). In certain embodiments, one or more processors (e.g., microcontroller 2300) may interface with light sensors to receive light sensor data. For example, microcontroller (2300) may be connected or coupled to one or more light sensors wirelessly (e.g., Wi-Fi, Zigbee, Bluetooth) or via a wired connection (e.g., USB, I$^2$C, SPI, a connector, or other cable). In turn, microcontroller (2300) may be coupled via wire (e.g., USB) or wirelessly (e.g., Wi-Fi, Zigbee, Bluetooth) to one or more secondary processors (e.g., processor 2100) for determining a position for and tracking objects using the sensor data. In certain embodiments, one processor (e.g., microcontroller 2300), power source (2200), and light sensors (e.g., light sensors 1300 of FIG. 1) are part of a first device (e.g., device 2400), while a second processor (e.g., processor 2100) and power source (2200) are part of a second device (e.g., device 2500). In certain embodiments, an IMU (e.g., IMU 1500 of FIG. 1) may be part of the first device and connected or coupled to microcontroller (2300) wirelessly (e.g., Wi-Fi, Zigbee, Bluetooth) or via a wired connection (e.g., USB, I²C, SPI, a connector, or other cable). In certain embodiments, an IMU (e.g., IMU 1500 of FIG. 1) may be part of the second device and connected or coupled to processor (2100) wirelessly (e.g., Wi-Fi, Zigbee, Bluetooth) or via a wired connection (e.g., USB, I²C, SPI, a connector, or other cable). In certain embodiments, an IMU (e.g., IMU 1500 of FIG. 1) may be part of both first and second devices. In certain embodiments, when IMUs are located on both first and second devices, the system may fuse together IMU measurement data received from both IMU sources or may select between using IMU measurement data from the first or second device based on a variety of factors. For example, IMU measurement data may be selected based on the relative accuracy of each IMU in the aggregate or of the individual components (e.g., gyroscope, magnetometer, accelerometer). In certain embodiments, IMU measurement data may be selected based on the relative power requirements of each IMU. In certain embodiments, the unselected (e.g., high power or lower accuracy) IMU is shutdown (e.g., disconnected from its power source). First and second devices may also be connected or coupled to one another wirelessly (e.g., Wi-Fi, Zigbee, Bluetooth) or via a wired connection (e.g., USB, I²C, SPI, a connector, or other cable).

In certain embodiments, the one or more processors (e.g., microcontroller 2300) which interface with the light sensors transmit the light sensor data received from the light sensors to the one or more processors (e.g., processor 2100) for determining the position of and tracking objects using the sensor data. In certain embodiments, the one or more processors (e.g., microcontroller 2300 or processor 2100) which interface with the IMU transmits the IMU measurement data received from the IMU to one or more other processors (e.g., processor 2100 or microcontroller 2300) for determining the position of and tracking objects using the sensor data. In certain embodiments, processor 2100 for determining position of and tracking objects may be included in a smartphone or other similar device. The smartphone may then be coupled to the light sensors and microprocessor (2300) via a USB connection.

FIG. 2C is an exemplary embodiment depicting how passive/ordinary devices (e.g., devices with no/insufficient onboard processing and/or power), such as a scalpel may become track-able in a VR/AR environment. Here, the system includes a battery powered processor that can be attached, along with an array of light sensors to any passive device to enable that device to be tracked. For example, a microcontroller, light sensors and/or battery may be coupled together and incorporated into/on the passive device. The microcontroller may communicate light sensor data to a second processor (e.g., ARM processor) via wire or wirelessly (Wi-Fi, Bluetooth, and/or RF). The second processor may than determine position and pose of as well as track the passive object using the received light data.

Figure 3A:
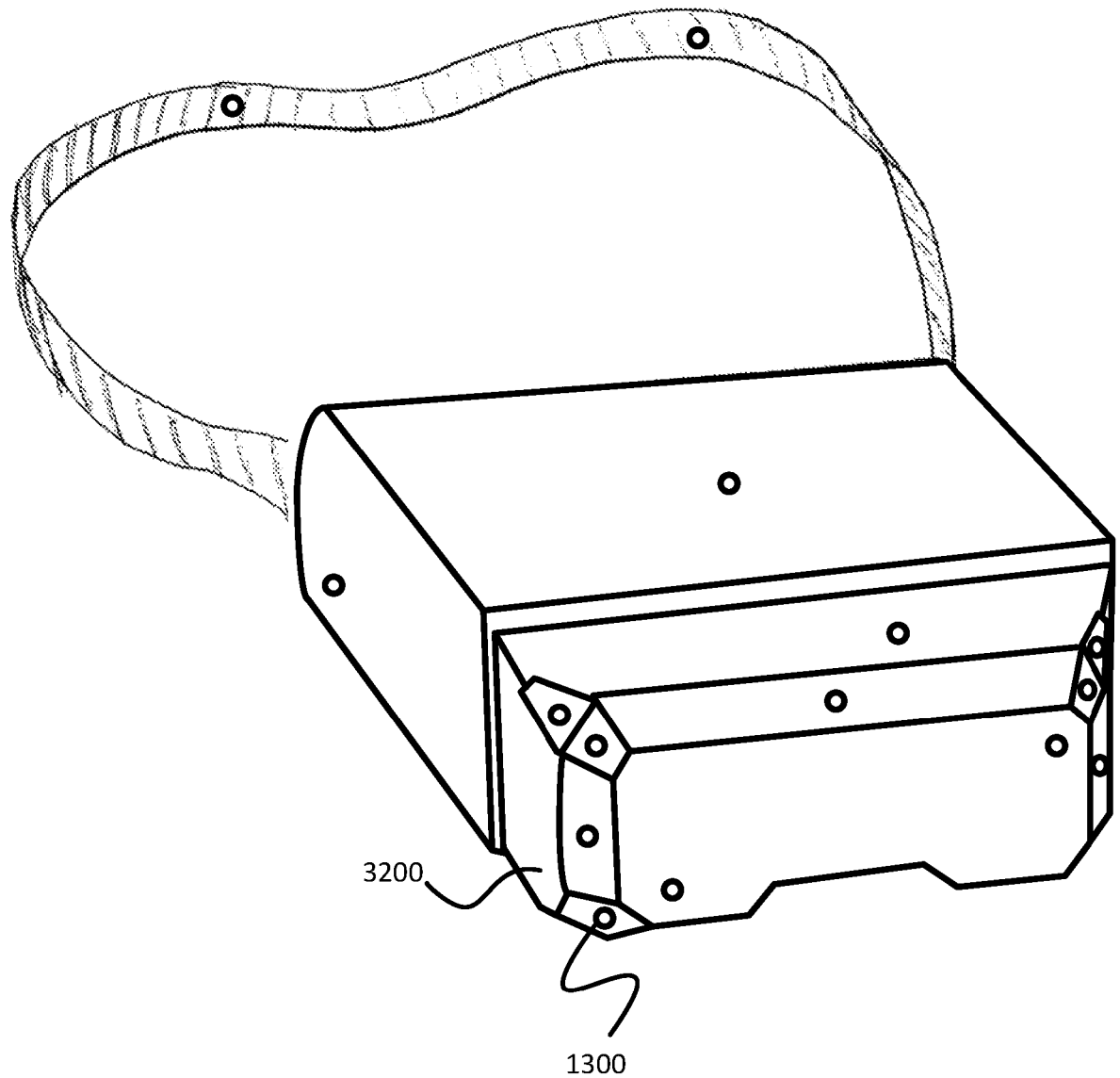
FIG. 3A is a schematic diagram illustrating an object in accordance with certain embodiments.
Figure 3B:
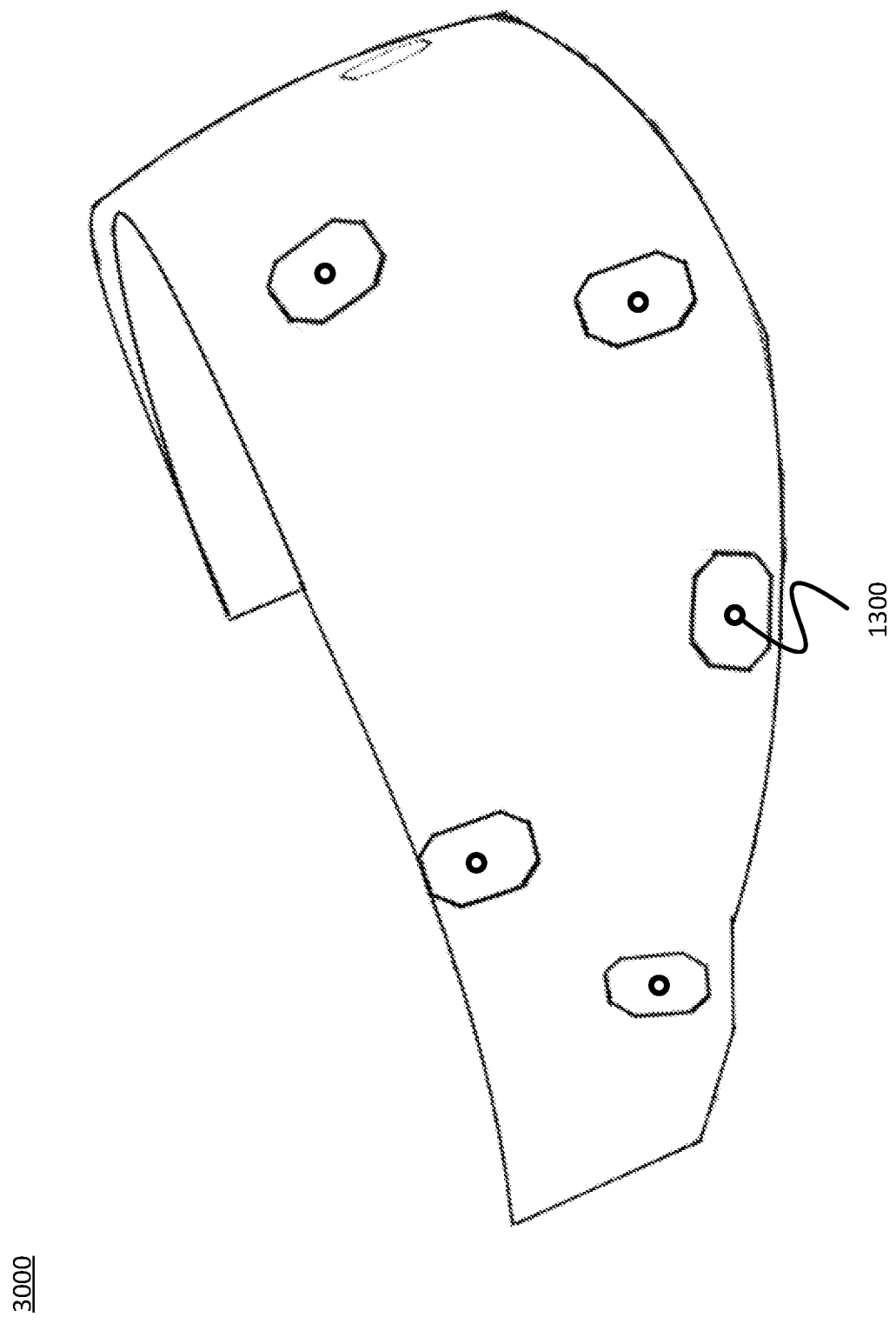
FIG. 3B is a schematic diagram illustrating an object in accordance with certain embodiments.

FIGS. 3A and 3B are exemplary embodiments of a system 3000 in accordance with certain embodiments of the invention. For example, the systems of FIGS. 3A and/or 3B may be used as an object 1100 in the system of FIG. 1. In addition, any of the processing architectures described in relation to FIGS. 2A, 2B, and/or 2C may be incorporated into the system of FIGS. 3A and/or 3B such that its position may be determined and tracked using any of the methods discussed in accordance with FIGS. 4 and 7-9. FIG. 3A depicts a system including an array of light sensors disposed in a plurality of planes. As depicted in FIG. 3A, light sensors (1300) may be disposed on a faceplate, top, bottom, sides of the headset and/or one or more securing straps. Disposing sensors in more than one plane provides the ability for systems (e.g., system of FIG. 1) and methods (e.g., methods of FIGS. 4 and 7-9) to more accurately determine position using a single light emitter even when or more sensors may be occluded. In certain embodiments, as shown in FIG. 3A sensors (and processing architectures) may be incorporated as part of a removable faceplate (3200), which can be further attached and secured to a pre-existing VR/AR headset to add improved position and pose determination as well as tracking. In certain embodiments, faceplate 3200 may include various slits, fans, or louvres to improve ventilation and cooling. In certain embodiments, as shown in FIG. 3B, sensors (and processing architectures) may be incorporated into a band like device (e.g., headband, wristband, armband).

Figure 4:
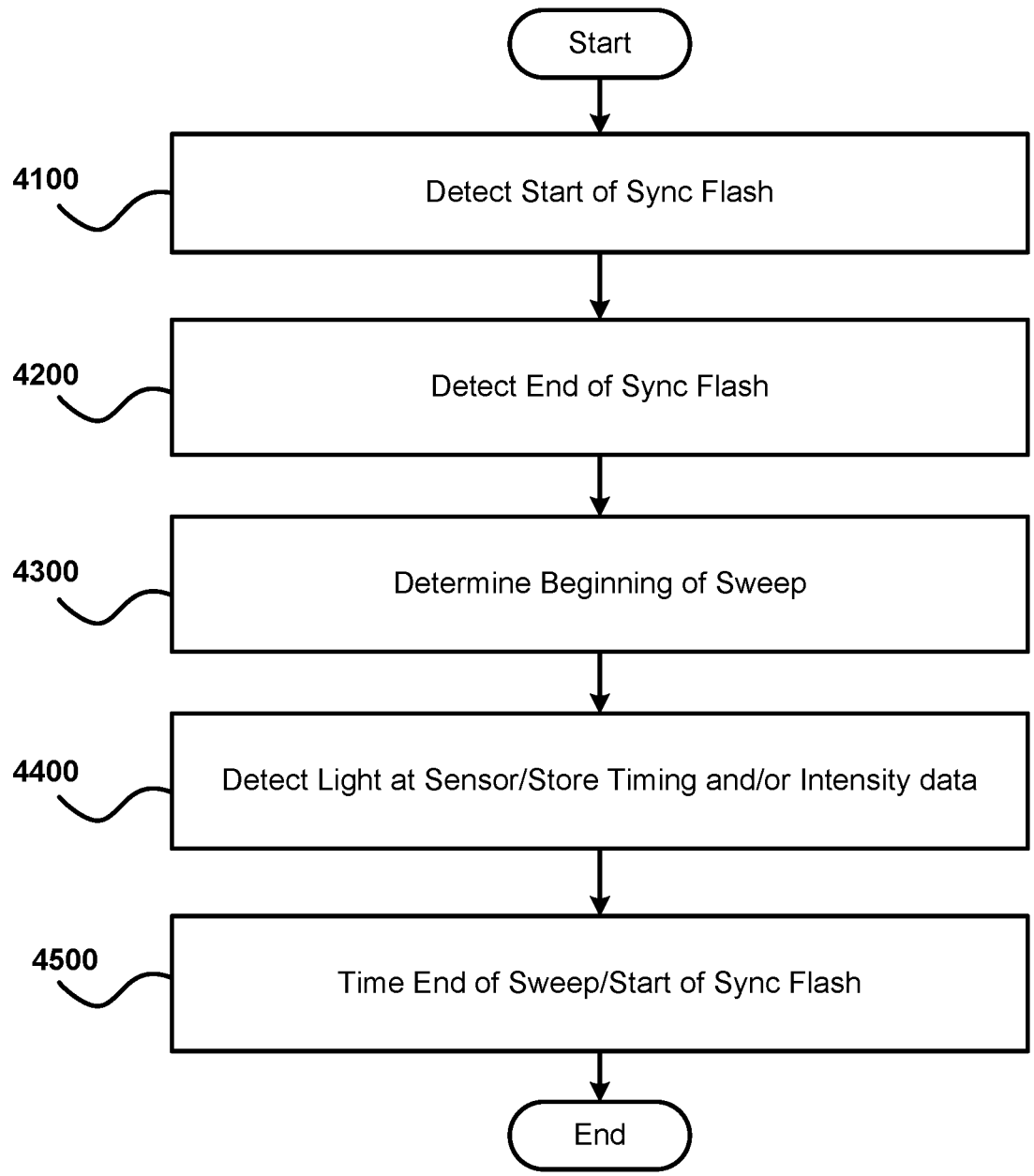
FIG. 4 is a flow diagram illustrating a method for determining azimuth and elevation for a light sensor in relation to a light source in accordance with certain embodiments.

FIG. 4 is an exemplary method 4000 for determining position of an object in accordance with certain embodiments. The method of FIG. 4 may be used in accordance with any of the systems described above with respect to FIGS. 1, 2A, 2B, 2C, 3A, and/or 3B. For example, processors 1400 of FIG. 1 and/or processor 2100 and/or microcontroller 2300 of FIGS. 2A, 2B, 2C may be configured to perform the steps of the method of FIG. 4 described herein. In certain embodiments, one or more processors (e.g., processor 2100 or microcontroller 2300 of FIGS. 2A, 2B, 2C) are used to determine a type of operation (e.g., sync flash or sweep) being performed by one or more light emitters (e.g., light emitter 1200 of FIG. 1). In step 4100, the presence of a sync flash may be detected. In certain embodiments, a sync flash is a wide area saturation of light. In certain embodiments, a sync flash is determined to have occurred when a certain number (e.g., 3, 8, 12, or more) or a certain proportion of light sensors attached to an object detect a light transmission simultaneously or within a certain time period. In certain embodiments, a sync flash is detected based upon how long one or more sensors is illuminated. For example, a sync flash may be determined when one or more light sensors is illuminated for longer or shorter than a given time period. In certain embodiments, a sync flash is detected based on the level of illumination (brightness) of light received at one or more light sensors. For example, if a sync flash emission is brighter than a sweep, a sensor receiving such higher amplitude light may be indicative of a sync flash.

In certain embodiments, detection of a sync flash is performed by disabling interrupts and polling each light sensor. Polling of light sensors may be performed serially and/or in parallel. For example, a number of n-bit sensors may be connected to an N-bit data bus of a processor such that N/n sensors may be polled simultaneously. As a specific example, 32 1-bit sensors may be polled simultaneously with a 32-bit bus. In this example, detection of a sync flash may be accomplished by counting the number of bits read from the data bus which indicate light reception by a light sensor. In certain embodiments, a sync flash is detected by determining how long one or more bits on the data bus remains indicative of light being received at the associated sensor. In certain embodiments, detection of a light pulse will trigger an interrupt causing a processor to determine if a sync pulse has been detected.

In step 4200, the end of a sync flash may be determined. In certain embodiments, the end of a sync flash is detected when following the detection of a sync flash, fewer than a certain number (e.g., 12, 8, 3, or less) or less than a certain proportion of light sensors detect a light transmission simultaneously or within a certain time period. In step 4300, the beginning of a light sweep (e.g., vertical, horizontal, diagonal) of a light emitter may be timed. In certain embodiments, a sweep is a narrow band of light when compared to a sync flash. Timing of the sweep may occur following the detection of the beginning or the end of a sync flash. In certain embodiments, a processor may re-enable interrupts and begin waiting for sweep completion.

In step 4400, light may be detected at one or more light sensors. In response to light detection, timing information may be stored. For example, the time between the beginning of the sweep and the detection of light may be stored in a memory. In certain embodiments, timing information is used to derive angular position (azimuth ($\beta$), and elevation ($\theta$)) for the light sensor relative to the emitter. In certain embodiments, light intensity data indicating the brightness of the received light is also stored. Light intensity data (along with timing data) may be used to differentiate (reject) reflected and/or multipath signals from light received directly. In certain embodiments, the angular position (e.g., rotation degree/offset) of a light sweep (e.g., vertical, horizontal, diagonal) may be encoded in the light transmission itself (e.g., by modulating the light pulse). By encoding sweep position in the light transmission itself, in certain embodiments, a sync flash may no longer be required. In certain embodiments, position information may be encoded in the emitted light itself by offsetting the frequency of the emitted light and associating the frequency offset with an angular position. For example, as a sweep progress from 0 to 360 degrees the frequency of light emitted by the emitter may also be increased or decreased in accordance with the progress of the sweep from 0 to 360 degrees. Accordingly, angular position (azimuth ($\beta$) and elevation ($\theta$)) for the light sensor relative to the emitter may be derived based on the determination of an offset between the frequency of the light received at the sensor and a base frequency of light emitted by the emitter.

In step 4500, the end of a light sweep or beginning of a sync flash may be timed. For example, a processor may use internal processor timing to detect the expected end of a sweep or the expected beginning of the next sync flash. In certain embodiments, a processor may disable interrupts and once again begin polling light sensors for a sync flash.

Using the exemplary systems of FIGS. 1, 2A, 2B, 2C, 3A, and/or 3B as well as the methods of FIG. 4 it is possible to determine the position and pose of as well as track objects in a physical environment. This position and pose data may then be used in an AR/VR environment. Position/pose of the object is determined based upon streams of light sensor data received from one or more light sensors. Prior solutions for determining position of tracked objects using light emitters and sensors have been previously described in Islam et al., "Indoor Positional Tracking Using Dual-Axis Rotating Laser Sweeps," IEEE International Instrumentation and Measurement Technology Conference Proceedings, p. 1315-21, Taipan, Taiwan (2016).

Figure 5:
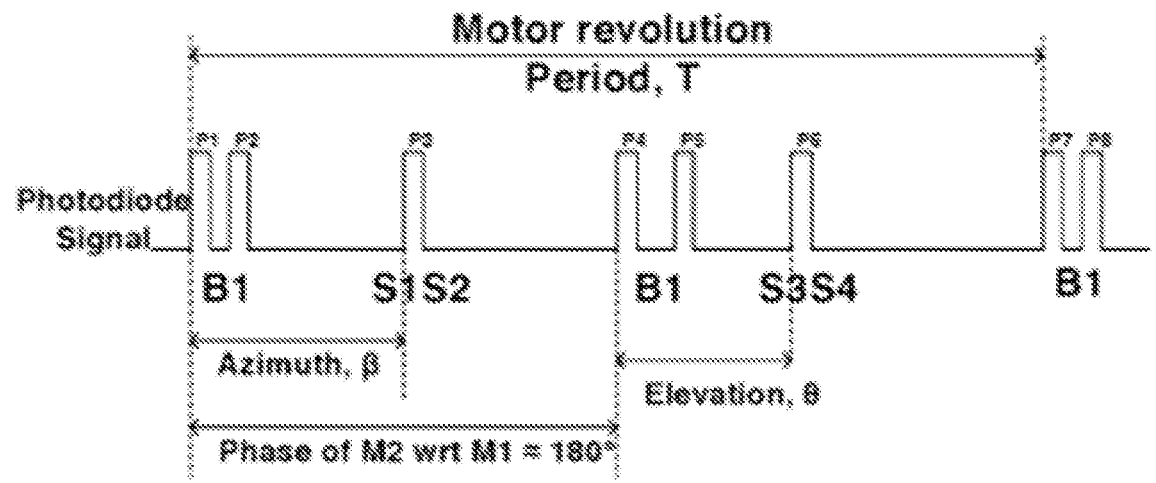
FIG. 5 is a waveform illustrating timing pulses received at a light sensor in accordance with certain embodiments.

FIG. 5 depicts an exemplary pulse train emitted from a light emitter (e.g., light emitter 1200 of FIG. 1) and received by a light sensor (e.g., light sensor 1300 of FIG. 1) present on a tracked object (e.g., object 1100 of FIG. 1). In FIG. 5, pulses P1 and P2 are sync pulses emitted by a light emitter base station. These sync pulses may be emitted when the azimuth (horizontal) angle is 0° for a vertical sweep. Barring occlusion, these pulses should be received by all light sensors on the tracked object. Pulse P3 is received by a light sensor when the vertical sweep passes it. The time between the rising edges of the pulse P1 and P3 provides a direct measurement of the azimuth angle ($\beta$) of the light sensor in the target constellation, according to the following equation where T is the period between scans.

$$\text{Azimuth } \beta = \left(\frac{\text{time}(P_3) - \text{time}(P_1)}{T}\right) \times 360°$$

In FIG. 5, pulses P4 and P5 are also sync pulses emitted by a light emitter base station. These sync pulses may be emitted when the elevation (vertical) angle is 0° for a horizontal sweep. Barring occlusion, these pulses should be received by all light sensors on the tracked object. Pulse P6 is received by a light sensor when the horizontal laser line passes it. The time between the rising edge of pulse P4 and P6 provides a direct measurement of the elevation angle ($\theta$) of the light sensor in the target constellation according to the following equation.

$$\text{Elevation, } \theta = \left(\frac{\text{time}(P_6) - \text{time}(P_4)}{T}\right) \times 360°$$

In FIG. 5, pulses P7 and P8 are similar to P1 and P2 and indicate the start of a new revolution. Generally, pulses P1 and P2 are emitted from the base station in such a way that the laser line pulse P3 does not interfere with pulse P1 or P2. Likewise, pulses P4 and P5 are sent out from the base station in such a way that the laser line pulse P6 does not interfere with P4 or P5.

Figure 6:
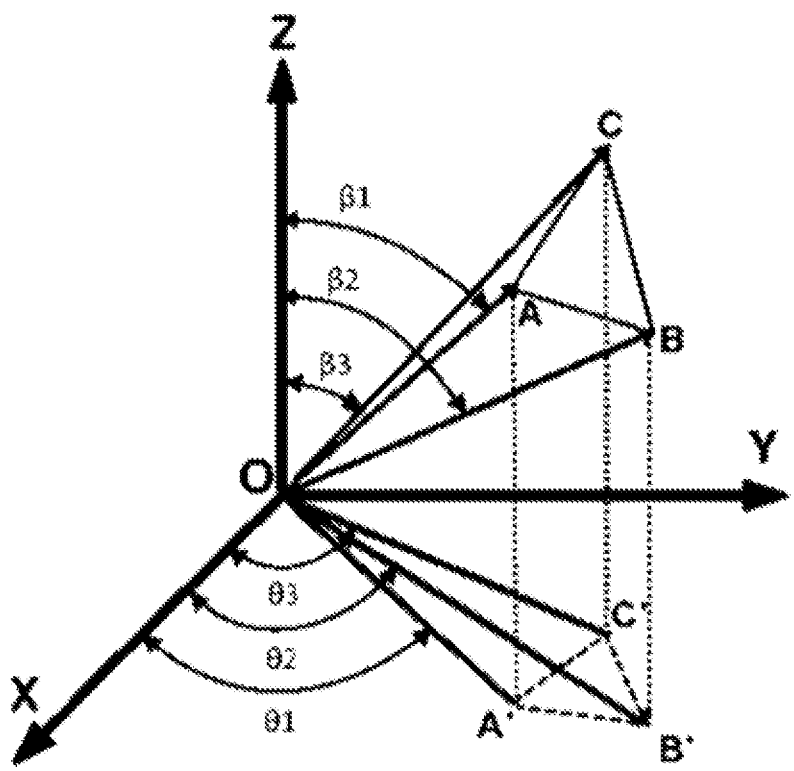
FIG. 6 is coordinate system illustrating the position of light sensors in accordance with certain embodiments.

According to the spherical coordinate system (range (R), azimuth ($\beta$), and elevation ($\theta$)), light sensors A, B, and C will be located with coordinates $(R_A, \theta_1, \beta_1)$, $(R_B, \theta_2, \beta_2)$, and $(R_C, \theta_3, \beta_3)$. FIG. 6 depicts the spherical coordinate system and the relationship amongst sensors A, B, and C.

As discussed above, azimuth and elevation are measured using the base station and received light signals. Range of the sensors may be solved for via a system of non-linear equations.

$f(R_A, R_B) = R_A^2 + R_B^2 - 2R_A R_B \cos \alpha_{AB} - AB^2 = 0$ $f(R_B, R_C) = R_B^2 + R_C^2 - 2R_B R_C \cos \alpha_{BC} - BC^2 = 0$ $f(R_A, R_C) = R_A^2 + R_C^2 - 2R_A R_C \cos \alpha_{AC} - AC^2 = 0$ $\cos \alpha_{AB} = \sin \beta_1 \cos \theta_1 \sin \beta_2 \cos \theta_2 + \sin \beta_1 \sin \theta_1 \sin \beta_2 \sin \theta_2 + \cos \beta_1 \cos \beta_2$ $\cos \alpha_{BC} = \sin \beta_2 \cos \theta_2 \sin \beta_3 \cos \theta_3 + \sin \beta_2 \sin \theta_2 \sin \beta_3 \sin \theta_3 + \cos \beta_2 \cos \beta_3$ $\cos \alpha_{AC} = \sin \beta_1 \cos \theta_1 \sin \beta_3 \cos \theta_2 + \sin \beta_1 \sin \theta_1 \sin \beta_3 \sin \theta_3 + \cos \beta_1 \cos \beta_3$ When the length of the sides AB, BC, and AC are known in advance, the system of equations can be solved for using a root finding method (e.g., Newton's root finding method). The length of the sides AB, BC, and AC may be known in advance when the light sensors are fixed relative to each other or can otherwise be determined via a measurement. For example, when two or more light sensors are on a flexible or spooled band a potentiometer, spring, or similar tool could be used measure the distance between them.

Figure 7:
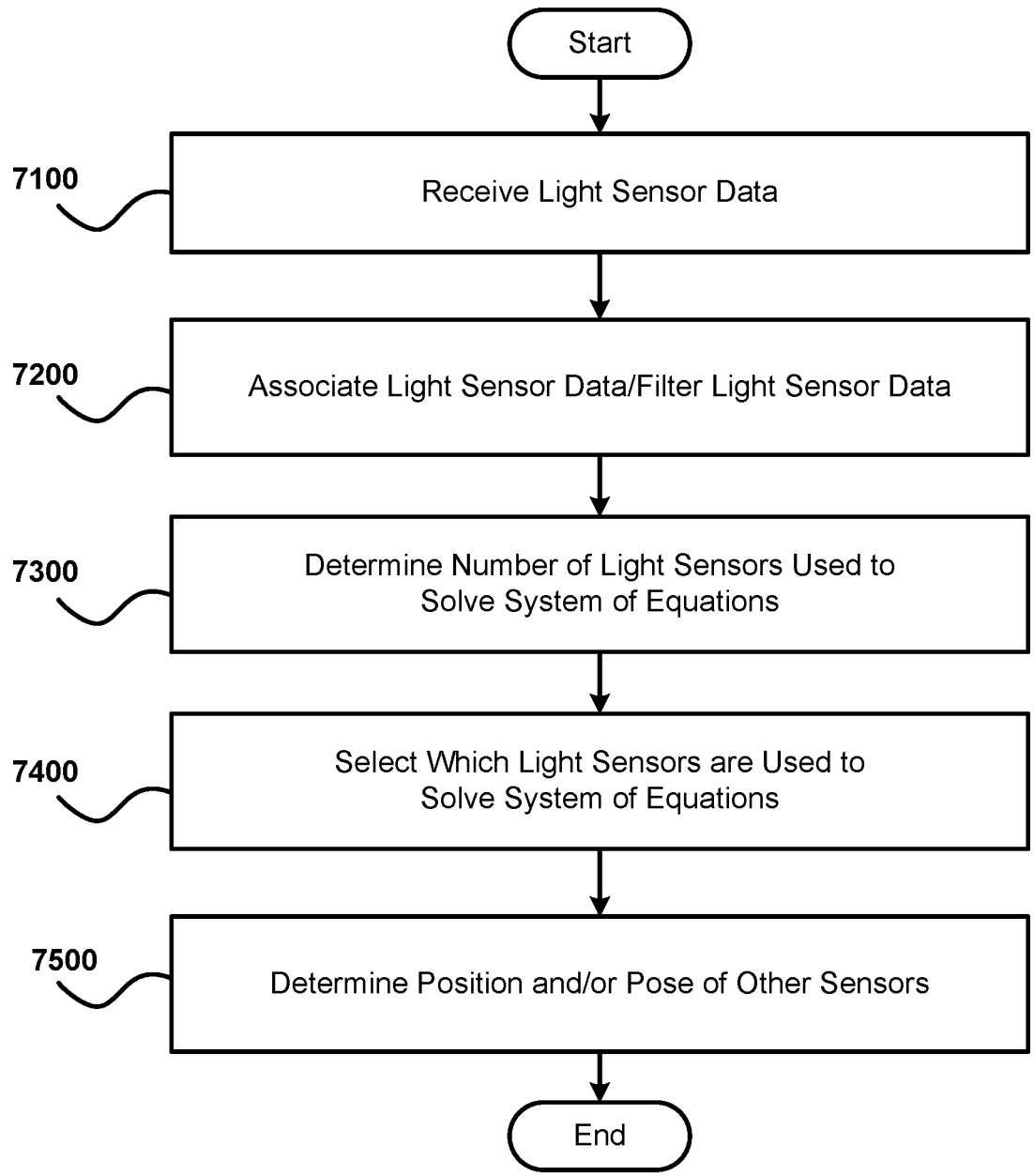
FIG. 7 is a flow diagram illustrating a method for determining position and pose for an object outfitted with an arbitrary number of light sensors in accordance with certain embodiments.

FIG. 7 is an exemplary method 7000 for determining position of an object on which more than three light sensors are disposed in accordance with certain embodiments. The method of FIG. 7 may be used in accordance with any of the systems described above with respect to FIGS. 1, 2A, 2B, 2C, 3A, and/or 3B as well as the method of FIG. 4. For example, processors 1400 of FIG. 1 and/or processor 2100 and/or microcontroller 2300 of FIGS. 2A, 2B, 2C may be configured to perform the steps of the method of FIG. 7 described herein. Any number of sensors may be fitted to a tracked object, thus reducing the effects of possible occlusion, while still having enough sensors to accurately determine position. Generally, it is possible to solve for the ranges of any number of sensors. For example, a VR/AR headset may be outfitted with 20 or more light sensors. In certain embodiments, multi-planar light sensor placement along with the linear-system property discussed herein may be used to heuristically limit the number of iterations in the root finding method used to solve for light sensor ranges.

In step 7100, timing and/or light intensity data may be received for one or more light sensors. In certain embodiments, light timing and/or intensity data was previously stored as part of the methods of FIG. 4. In step 7200, the received light sensor data may be associated with one or more light sensors. In certain embodiments, light sensor data may be filtered as part of step 7200 or other steps.

In step 7300, a determination is made as to the number of light sensors (for which data was received) are to be used to solve a system of equations for determining the object's position and pose. For example, an object may be outfitted with twenty light sensors, light sensor data may be received for any number of those sensors, such as fifteen. In this case, position and pose of the object may be determined using systems of equations using any number of sensors between three and fifteen. In certain embodiments, the number of light sensors used to solve the system of equations is based upon various observed system states. Examples of such systems states are: remaining battery power, battery usage rate, loading (e.g., CPU, I/O, etc.), temperature, frame rate, or other application/user settings. In certain embodiments, the n-brightest sensors based on light intensity data are used to solve the system of equations. For example, the n-brightest sensors may be those n-sensors that received light exceeding a threshold. In certain embodiments, the number of sensors used is based on covering a minimum area/volume framed by the physical placement of the light sensors on the object. For example, if light data is received for fifteen of twenty sensors disposed on an object, the number of sensors used to solve the system of equations may be the minimum number of sensors which cover at least a determined number of square or cubic inches. In embodiments where sensor geometry is known in advance, mappings between sensor combinations and covered surface area may be computed and stored in advance. In other embodiments, covered area or volume for sensor combinations may be computed as needed based on a known geometry. In certain embodiments, the previous examples may be combined and any of the factors weighted to arrive at an appropriate number of sensors to use in solving the system of equations.

In step 7400, a determination may be made as to which of n-sensors to use in solving a system of equations for determining the object's position and pose. For example, in step 7300, it may have been determined to use four sensors out of a possible fifteen sensors for which light sensor data was received to determine position and pose of the object. In certain embodiments, it may be desirable to select the sensors in order to maximize/minimize the area or volume covered by the n (in this case 4) sensors used to solve the system of equations. In certain embodiments, sensors may be selected based on their planar orthogonality. For example, n-sensors may be selected based on maximizing or minimizing the number of planes covered by the sensors. In certain embodiments, the n-sensors may be selected based on the relative time differences of when they received light. For example, the n-sensors may be chosen to maximize or minimize the timing difference amongst them. To further illustrate, in certain embodiments, a sensor which received light the earliest during a sweep and the sensor which received light the latest during a sweep may be used to solve the system of equations. In certain embodiments, selection of which of n-sensors to use for solving the system of equations is based on which sensors were previously used to solve the system. For example, if sensors A, B, and C were used as part of a previous solution any combination (e.g., one, two, all) of A, B, C may selected to solve the system of equations. To further illustrate, if four sensors are being used to solve the current system of equations, sensors A, B, C, E may be used as part of a solution or sensors B, C, E, F may be used instead. In certain embodiments, the previous examples may be combined and any of the factors weighted to arrive at a grouping of which sensors to use in solving the system of equations. In certain embodiments, selection of which of n-sensors to use for solving the system of equations is based on a state in a VR/AR environment (e.g., position of a camera, location of a point of interest, setting, etc.).

In step 7500, the positions and/or pose of the other sensors (e.g., those sensors not used to solve the system of equations) is determined. For example, a rigid body transform may be used to locate the other sensors based on the known or measured geometry of the sensors disposed on the object as well as the positions for the sensors as determined by the solution to the system of equations.

As discussed above, the ranges of the various sensors represent the unknown variables, the light sensor timing data represents the azimuth and elevation of the sensors, while the sensor geometry describes the number of simultaneous equations. For example, in the case of four sensors there are four unknown ranges, one for each sensor and a corresponding set of six equations. The six equations include the three above for $f(R_A, R_B)$, $f(R_B, R_C)$, $f(R_A, R_C)$ as well as three equations which includes the geometry for the fourth sensor (D) relative to other three: $f(R_D, R_A)$, $f(R_D, R_B)$, $f(R_D, R_C)$.

Accordingly, in certain embodiments, less than the entire number of simultaneous equations is used. For example, in addition to f(RA, RB), f(RB, RC), f(RA, RC) only one of: f(RD, RA), f(RD, RB), f(RD, RC) may be used (solved for). Other combinations are acceptable. Using only one of f(RD, RA), f(RD, RB), f(RD, RC) makes the number of variables equal to the number of equations. Similarly, for each additional sensor only one additional equation may be solved for (e.g., 8 sensors, 8 equations describing their geometry). In certain embodiments, a pseudo-inverse is used to solve for the system of linear or non-linear equations. For example, when using an overdetermined system—more equations than unknowns—a pseudoinverse may be used as a part of a root-finding method used to solve the system of equations.

In certain embodiments, the computational complexity of solving for the non-linear system can be reduced by solving a linear system approximating the solution to the non-linear system. In certain embodiments, azimuth and elevation measurements derived from three or more identified light sensors are used to solve the linear system. The linear solution may then be applied as initial values for the solution to the non-linear system (e.g., as initial values for the root finding method). When starting from a linear solution, in certain embodiments, when the non-linear system converges quickly (i.e., within a small number of iterations for a given tolerance), the linear solution may be returned as a solution to the non-linear system. In certain other embodiments, a solution provided by an iteration of the non-linear root finding method may be used. In certain embodiments, a prior solution, filtered output (discussed below in relation to FIG. 8), and/or predicted output (discussed below in relation to FIG. 9) or a weighted combination thereof, may be applied as initial values for the solution to the non-linear system (e.g., as initial values for the root finding method).

Solving for the system of equations as discussed above, provides an accurate estimate of the tracked object's position (range, azimuth, elevation). The position estimates, however, are generally subject to noise. Such noise in the tracked object's position may show up as judder in an AR/VR environment. Simple low-pass filtering of the tracked objection's position may be used to reduce judder, however, this increases the system's response times and correspondingly reduces immersion and may lead to user sickness.

Figure 8:
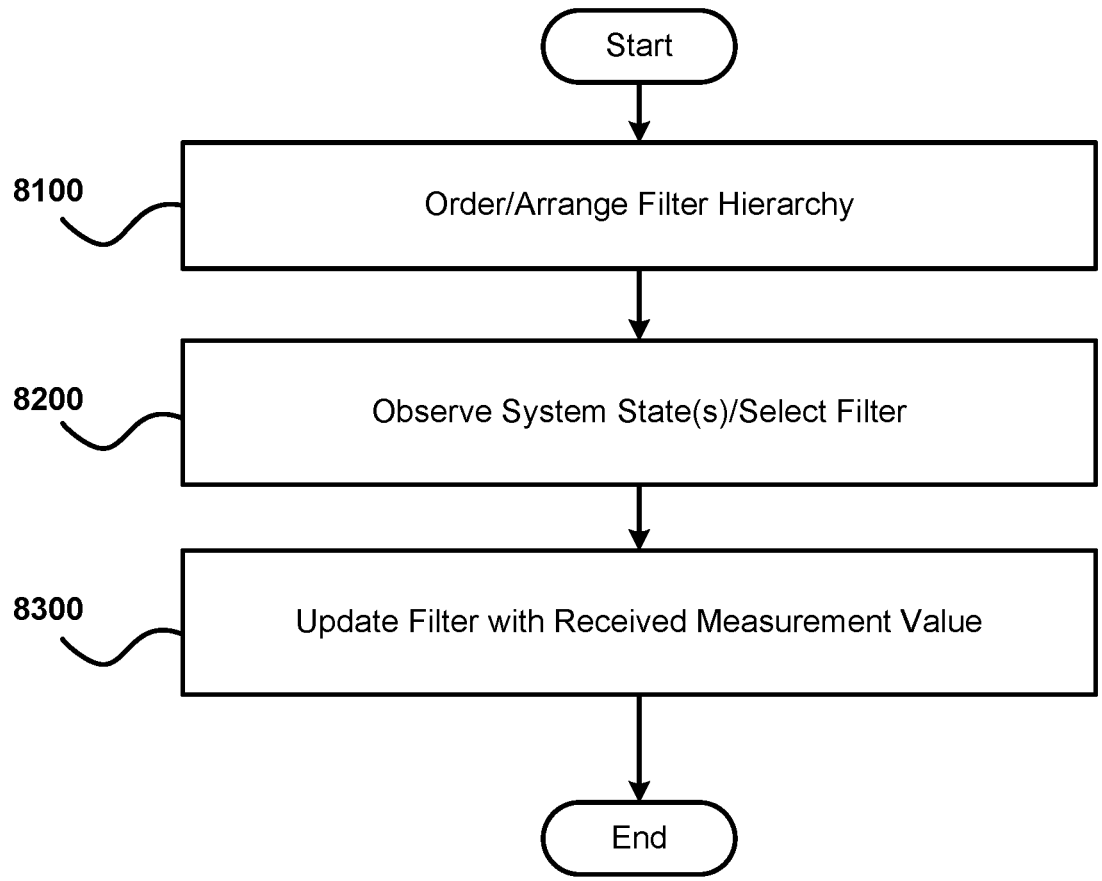
FIG. 8 is a flow diagram illustrating a method for filtering position and pose data using a filter lattice in accordance with certain embodiments.

FIG. 8 depicts an exemplary method 8000 for reducing judder while maintaining system response times in accordance with certain embodiments. The method of FIG. 8 may be used in accordance with any of the systems described above with respect to FIGS. 1, 2A, 2B, 2C, 3A, and/or 3B as well as the methods of FIGS. 4 and 7. For example, processors 1400 of FIG. 1 and/or processor 2100 and/or microcontroller 2300 of FIGS. 2A, 2B, 2C may be configured to perform the steps of the method of FIG. 8 described herein. In certain embodiments, a hierarchy of filters is employed in order to smooth the estimate of the tracked object's position. In step 8100, a hierarchy of filters may be arranged. For example, the hierarchy of filters may be arranged based on output quality and/or computational cost. In certain embodiments, the ordering may result in a totally ordered lattice, where $F=\{f_1, f_2, \ldots f_n\}$ is the set of filters and $<$ is a total order over F.

In step 8200, one or more systems states may be observed and a filter may be selected. For example, if $f_i < f_j$ then the adaptive filtering system may transition from filter $f_i$ to filter $f_j$ on the occurrence of an observation threshold. An observation threshold is a tuple of values related to various system states. For example, system states may be related to: remaining battery power, battery usage rate, loading (e.g., CPU, I/O, etc.), temperature, frame rate, or other application/user settings). In certain embodiments, when one or more threshold values is exceeded the system transitions from filter $f_i$ to filter $f_j$. However, when no or only limited/certain threshold values are exceeded, the system may choose to use the highest-quality filter available. In certain embodiments, system states are individually weighted, such that the chosen filter will be based on the weighted summation of the various observed system states. Any suitable filter may be used for adaptive filtering (e.g., Kalman, Chebyshev, Butterworth, moving average, etc.). In step 8300, the selected filter may be updated with one or more measurement values. For example, sensor position and pose estimates previously determined by a solution to a system of equations as discussed above with respect to FIG. 7 may be used to update filtered position estimates for one or more sensors on an object (e.g., object 1100 of FIG. 1).

To further illustrate, consider a moving average filter and a Kalman filter which are both run over the same raw data input. The Kalman filter is perceived to be of higher quality as it removes more visual vibrations from the user's AR/VR experience. However, the Kalman filter requires significantly more floating point operations than the moving average filter. For example, if CPU usage drops below 25% then the system may use the higher-quality Kalman filter. However, if frame rate decreases below a threshold when using the Kalman filter then the system may prefer the computationally cheaper moving average filter. In certain embodiments, switching amongst filters is supported by maintaining a buffer of previous filtered positions that may be accessed by the next chosen filter. In certain embodiments, a filter is maintained for each sensor on the object. In certain embodiments, a filter is maintained for a maximum number of sensors that is less than the number sensors on the object. For example, the maximum number of filters may be based on the maximum number of sensors for which a system of equations may be solved for as discussed above with respect to the method of FIG. 4. In certain embodiments, the number of filters corresponds to the number of sensors for which a system of equations was solved for as discussed with respect to the method of FIG. 4.

Figure 9:
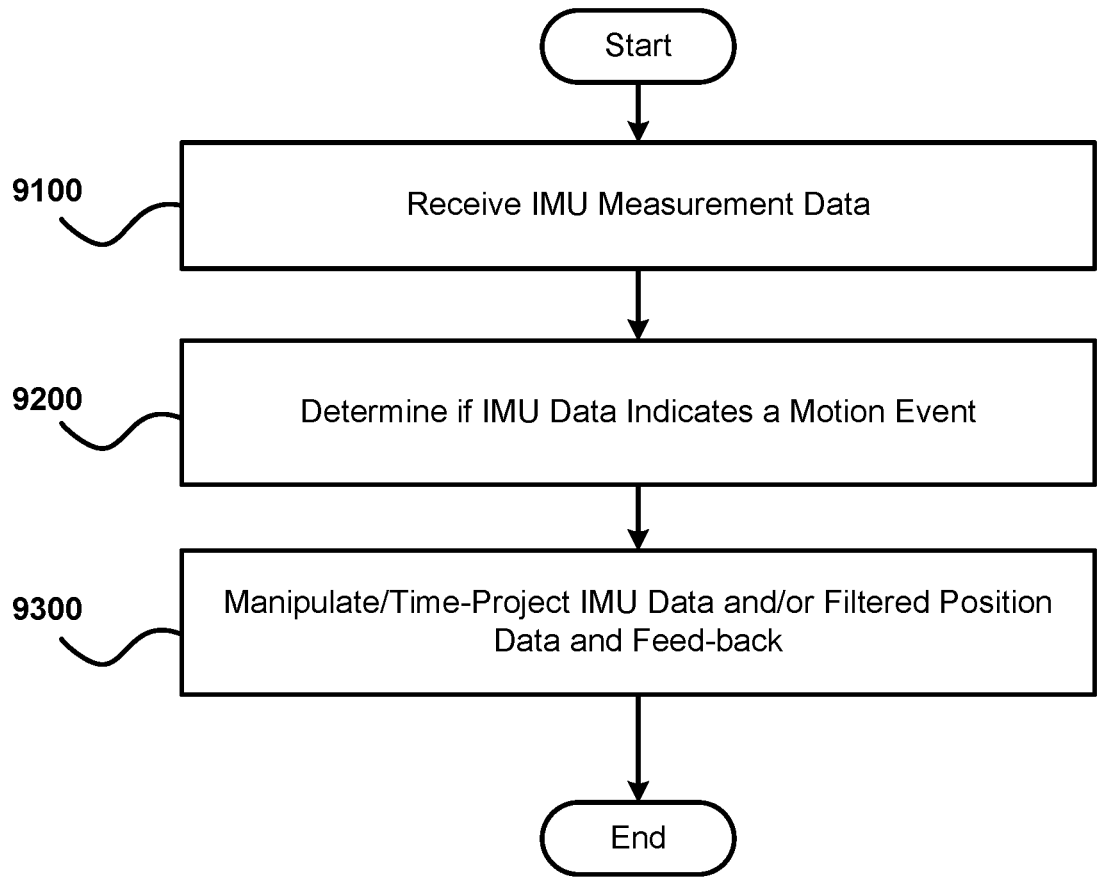
FIG. 9 is a flow diagram illustrating a method for employing IMU data to counterbalance certain effects of filtering the position and pose estimates of a tracked object.

FIG. 9 depicts an exemplary method 9000 for counterbalancing certain effects of filtering the position and pose of a tracked object. The method of FIG. 9 may be used in accordance with any of the systems described above with respect to FIGS. 1, 2A, 2B, 2C, 3A, and/or 3B as well as the methods of FIGS. 4, 7, and 8. For example, processors 1400 of FIG. 1 and/or processor 2100 and/or microcontroller 2300 of FIGS. 2A, 2B, 2C may be configured to perform the steps of the method of FIG. 9 described herein. In certain embodiments, accelerometer, magnetometer, and/or gyroscopic (IMU) data streams may be employed to counterbalance any over-smoothing effects of the judder smoothing filters discussed above. In certain embodiments, use of IMU data allows the AR/VR system to maintain responsiveness and maintain or increase immersion. In step 9100, one or more sets of IMU measurement data may be received. In step 9200, a determination may be made as to whether the received IMU data indicates a motion event. For example, when the received IMU data exceeds certain thresholds (a magnitude) which indicate fast movement, the IMU data may be used instead of smoothed position/pose data. In certain embodiments, IMU and smoothed/filtered position sensor data may be weighted and combined based on the magnitude of the received IMU data. In certain embodiments, the choice of observation threshold values and/or weights is configurable by the application programmer or user. In step 9300, filtered/smoothed sensor position data and/or IMU data may be manipulated (e.g., time-forward projected) and fed back as an initial solution to the system of non-linear equations discussed above.

Figure 10:
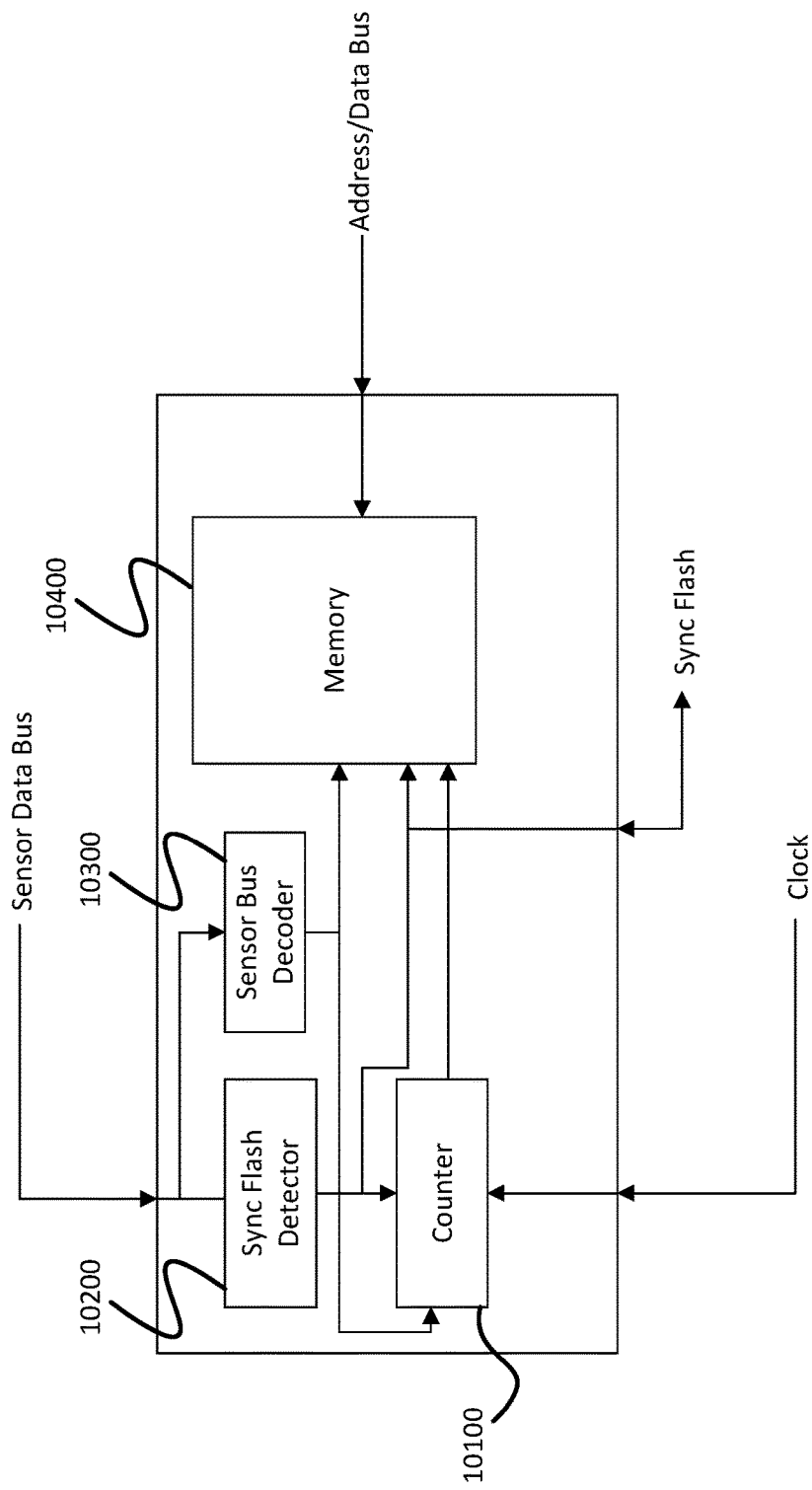
FIG. 10 is a block diagram illustrating a system in accordance with certain embodiments.

FIG. 10 depicts an exemplary timing module 10000 for determining the timing of when light emitted from a light emitter (e.g., light emitter 1200 of FIG. 1) is detected at one or more light sensors (e.g., light sensor 1300 of FIG. 1) in accordance with certain embodiments. For example, the system of FIG. 10 may be used in the system of FIG. 1 or as part of any of the processing architectures described in relation to FIGS. 2A, 2B, and/or 2C to allow for the position of light sensors to be determined and tracked using any of the methods discussed in accordance with FIGS. 4 and 7-9. In certain embodiments, timing module 10000 may replace microcontroller 2300 and/or memory 2350. Use of timing module 10000 may improve timing accuracy when compared with a processor, which may be less accurate due to masked interrupt states, serving of higher priority interrupts, or may also allow for increased angular resolution based on higher possible clock speeds in timing module 10000.

In certain embodiments, a clock signal may be used to drive one or more X-bit counters 10100 to cause it to count up/down. In certain embodiments, one X-bit counter may be used for each light sensor or a group of light sensors. In certain embodiments, a sensor data bus represents the combined n-bit signals from N or more light sensors. In certain embodiments, timing module includes a sync flash detector 10200, which is used to detect the presence of a sync flash emitted from a light emitter. In certain embodiments, a sync flash is determined to have occurred when a certain number (e.g., 3, 8, 12, or more) or a certain proportion of the N light sensors connected to the sensor data bus detect a light transmission simultaneously or within a certain time period. For example, in the case of 1-bit light sensors, a sync flash may be detected when three or more light sensors indicate a bit value consistent with the presence of the detection of light (e.g., '0' or '1'). In the case of n-bit light sensors, a sync flash may be detected when three or more light sensors indicate a value that exceeds or falls below a threshold consistent with the presence of light detection. In certain embodiments, when a particular light sensor detects light, the current value of a counter is stored in a memory 10400 in a location associated with the light sensor. In certain embodiments, in order to capture light duration, when a particular light sensor stops detecting light following the detection of light, the current value of a counter is stored in a memory 10400 in a location associated with the light sensor. In certain embodiments, a sync flash is detected when the difference between counter values for one or more sensors exceeds a threshold.

Once a sync flash is detected, sync flash detector may output a sync flash signal. In certain embodiments, a sync flash signal is provided from a processor (e.g., processors 1400 of FIG. 1 and/or processor 2100 and/or microcontroller 2300 of FIGS. 2A, 2B, 2C) when it detects a sync flash. In certain other embodiments, sync flash signal is provided to a processor to indicate a sync flash was detected by timing module 10000.

In certain embodiments, counter(s) 10100 receive a sync flash signal, which causes counter(s) to return to a known value (e.g., reset). In certain embodiments, counter(s) or memory receive a sync flash signal, which causes the counter to store its current count value in a memory. In certain embodiments, for example, when counters are shared amongst two or more light sensors, during a light sweep following a sync flash, sensor bus decoder 10300 determines which of any of the N-light sensors connected to the sensor data bus have received light. In certain embodiments, when a particular light sensor detects light, the current value of a counter is stored in a memory 10400 in a location associated with the light sensor. In certain embodiments, in order to capture light duration, when a particular light sensor stops detecting light following the detection of light, the current value of a counter is stored in a memory 10400 in a location associated with the light sensor. In certain embodiments, timing module 10000 includes logic for correlating a light sensor with its timing data indicated by a counter value. In certain embodiments, for example, when memory locations in memory are not associated with a particular light sensor (e.g., in a FIFO), the identity of the light sensor receiving light is also stored in a memory alongside or pointing to its associated counter/timing data. In certain embodiments, memory receives a sync flash signal, which may cause the invalidation of its contents (e.g., writing an invalid bit or an invalid count value).

Following the completion of one or more sweeps (e.g., vertical, horizontal) or sweep pairs, a processor (e.g., processors 1400 of FIG. 1 and/or processor 2100 and/or microcontroller 2300 of FIGS. 2A, 2B, 2C) may read memory via address/data bus to retrieve stored timing values from memory. These timing values may be used to determine the position, pose, range of the various light sensors as discussed with respect to the methods of FIGS. 4 and 7-9. In certain embodiments, reading the memory causes the invalidation of its contents.

While there have been shown and described and pointed out various novel features of the invention as applied to particular embodiments thereof, it will be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the particular hardware and devices described, and the general functionality provided by and incorporated therein, may vary in different embodiments of the invention. Accordingly, the particular system components shown in the various figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A system for determining position and pose of a physical object, the system comprising:
   an emitter configured to provide a light sweep and a sync flash;
   at least four light sensors disposed on the object, wherein the at least four light sensors are configured to receive the light sweep and the sync flash from the emitter;
   a processor coupled to the light sensors and configured to:
      distinguish between the light sweep and the sync flash provided by the emitter;
      derive angular position relative to the emitter for at least one of the four light sensors based on light received from the emitter at the at least one light sensor during the light sweep;
      determine a number (N) of light sensors that are used to solve a system of equations using the derived angular position, the system of equations comprising at least (N) simultaneous equations, the solution of which provides range estimates for the (N) light sensors, the number (N) of light sensors being at least three;
      determine which of the at least four light sensors are used to solve the system of equations, the determination being at least partly based upon which of the at least four light sensors received light from the emitter during the light sweep;
      using the system of equations, solve for a range of each of the (N) light sensors; and
      using a rigid body transform and at least one of the solved for ranges or the derived angular position, determine a rigid-body position for any of the at least four light sensors that were not used to solve the system of equations.

2. The system of claim 1, wherein the at least (N) simultaneous equations is equal to (N).

3. The system of claim 1, wherein in order to determine the number (N) of light sensors that are used to solve a system of equations, the processor is further configured to:
   observe a system state;
   determine how many of the at least four light sensors received light exceeding a threshold; or determine how many sensors are needed to cover a minimum area or volume on the object.

4. The system of claim 3, wherein the system states comprise at least one of:
 battery power, battery usage rate, CPU loading, I/O loading, temperature, and frame rate.

5. The system of claim 1, wherein in order to determine which of the at least four lights sensors are used to solve the system of equations, the processor is further configured to:
 determine a maximum area or volume covered on the object by the (N) sensors;
 determine a time difference between when at least two of the at least four light sensors received light;
 select from a group of previously used sensors; or
 use a state in a virtual reality/augmented reality environment.

6. The system of claim 1, wherein the processor is further configured to: observe a system state;
 select a filter from an ordered filter lattice based on the observed system state; and
 update the selected filter with the solved-for range, derived angular position, or determined rigid-body position of one of the four or more light sensors.

7. The system of claim 6, wherein the system states comprise at least one of:
 battery power, battery usage rate, CPU loading, I/O loading, temperature, and frame rate.

8. The system of claim 6, wherein the processor is further configured to:
 receive inertial measurement unit data;
 using a predetermined threshold, determine if the received inertial measurement unit data represents a motion event;
 in response to determining that the received inertial measurement unit data represents a motion event, forward time project the output of the selected filter using the received inertial measurement unit data; and
 use the forward time projected output at least as part of an initial solution to the system of at least (N) simultaneous equations.

9. The system of claim 1, wherein to distinguish between the light sweep and the sync flash provided by the emitter, the processor is further configured to:
 detect a start of the sync flash when a certain number of the at least four light sensors receive light from the emitter within a given period of time.

10. The system of claim 1, wherein in order to derive angular position, the processor is further configured to:
 determine an offset between the frequency of light received at the at least one of the four light sensors and a base frequency of light emitted by the emitter.

11. The system of claim 1, wherein the object comprises a power source and a microcontroller coupled to the at least four light sensors, the microcontroller configured to:
 transmit data associated with at least one of the four light sensors that received light to the processor; and
 wherein the processor is located on a second device distinct from the object that is also wired or wirelessly coupled to the microcontroller.

12. The system of claim 1, wherein the object comprises a microcontroller coupled to the at least four light sensors, the microcontroller configured to:
 transmit data associated with at least one of the four light sensors that received light to the processor; and
 wherein the processor is located on a second device distinct from the object that is coupled to the object via a cable that supplies power to the at least four light sensors and the microcontroller.

13. A method for determining position and pose of an object in a physical environment, the physical environment comprising:
 an emitter configured for providing a light sweep and a sync flash;
 at least four light sensors disposed on the object, wherein the at least four light sensors are configured for receiving the light sweep and the sync flash from the emitter;
 a processor coupled to the light sensors, the method, operable with the emitter, the light sensors, and the processor, comprising:
 distinguishing by the processor between the light sweep and the sync flash provided by the emitter;
 deriving by the processor angular position relative to the emitter for at least one of the four light sensors based on light received from the emitter at the at least one light sensor during the light sweep;
 determining by the processor a number (N) of light sensors that are used to solve a system of equations using the derived angular position, the system of equations comprising at least (N) simultaneous equations, the solution of which provides range estimates for the (N) light sensors, the number (N) of light sensors being at least three;
 determining by the processor which of the at least four light sensors are used to solve the system of equations, the determination being at least partly based upon which of the at least four light sensors received light from the emitter during the light sweep;
 using the system of equations, solving by the processor for a range of each of the (N) light sensors; and
 using a rigid body transform and at least one of the solved for ranges or the derived angular position, determining by the processor a rigid-body position for any of the four or more light sensors that were not used to solve the system of equations.

14. The method of claim 13, wherein the at least (N) simultaneous equations is equal to (N).

15. The method of claim 13, wherein in order to determine the number (N) of light sensors that are used to solve a system of equations, the method further comprises:
 observing a system state;
 determining how many of the at least four light sensors received light exceeding a threshold; or
 determining how many sensors are needed to cover a minimum area or volume on the object.

16. The method of claim 15, wherein the system states comprise at least one of:
 battery power, battery usage rate, CPU loading, I/O loading, temperature, and frame rate.

17. The method of claim 13, wherein in order to determine which of the at least four lights sensors are used to solve the system of equations, the method further comprises:
 determining a maximum area or volume covered on the object by the (N) sensors;
 determining a time difference between when at least two of the at least four light sensors received light;
 selecting from a group of previously used sensors; or
 using a state in a virtual reality/augmented reality environment.

18. The method of claim 13, wherein the method further comprises:
 observing a system state;
 selecting a filter from an ordered filter lattice based on the observed system state; and updating the selected filter with the solved-for range, derived angular position, or determined rigid-body position of one of the four or more light sensors.

19. The method of claim 18, wherein the system states comprise at least one of:
    battery power, battery usage rate, CPU loading, I/O loading, temperature, and frame rate.

20. The method of claim 18, wherein the method further comprises:
    receiving inertial measurement unit data;
    using a predetermined threshold, determining if the received inertial measurement unit data represents a motion event;
    in response to determining that the received inertial measurement unit data represents a motion event, forward time projecting the output of the selected filter using the received inertial measurement unit data; and
    using the forward time projected output at least as part of an initial solution to the system of at least (N) simultaneous equations.

21. The method of claim 13, wherein to distinguish between the light sweep and the sync flash provided by the emitter, the method further comprises:
    detecting a start of the sync flash emitted by the emitter when a certain number of the at least four light sensors receive light from the emitter within a given period of time.

22. The method of claim 13, wherein in order to derive angular position, the method further comprises:
    determining an offset between the frequency of light received at the at least one of the four light sensors and a base frequency of light emitted by the emitter.

* * * * *